United States Patent [19]
Wang et al.

[11] Patent Number: 6,107,405
[45] Date of Patent: *Aug. 22, 2000

[54] METHOD OF MAKING GRAFTED POLYOLEFIN COMPOSITIONS

[75] Inventors: James Hongxue Wang; David Michael Schertz, both of Appleton, Wis.

[73] Assignee: Kimberly Clark Corporation, Neenah, Wis.

[*] Notice: This patent issued on a continued prosecution application filed under 37 CFR 1.53(d), and is subject to the twenty year patent term provisions of 35 U.S.C. 154(a)(2).

[21] Appl. No.: 08/733,410

[22] Filed: Oct. 18, 1996

[51] Int. Cl.⁷ .......................... C08L 23/26; C08F 255/02
[52] U.S. Cl. .......................... 525/193; 525/197; 525/69; 525/303; 525/309; 525/242
[58] Field of Search .................... 525/303, 309, 525/242, 69, 193, 197

[56] References Cited

U.S. PATENT DOCUMENTS

| | | | |
|---|---|---|---|
| 3,323,978 | 6/1967 | Rasmussen | 161/169 |
| 3,539,666 | 11/1970 | Schirmer | 264/51 |
| 3,717,541 | 2/1973 | Schirmer | 161/169 |
| 3,833,708 | 9/1974 | Miller et al. | 264/344 |
| 3,935,141 | 1/1976 | Potts et al. | |
| 3,954,928 | 5/1976 | Omori et al. | 264/51 |
| 4,018,729 | 4/1977 | Faucher et al. | 260/17 R |
| 4,080,405 | 3/1978 | Agouri et al. | 260/878 R |
| 4,186,233 | 1/1980 | Krajewski et al. | 428/213 |
| 4,725,492 | 2/1988 | Yazaki et al. | 428/317.7 |
| 4,792,477 | 12/1988 | Ociumi | 428/216 |
| 4,810,612 | 3/1989 | Ueda et al. | 430/109 |
| 4,868,222 | 9/1989 | Chau et al. | 521/61 |
| 5,095,619 | 3/1992 | Davis et al. | 30/41 |
| 5,300,574 | 4/1994 | Bacskai | 525/181 |
| 5,364,907 | 11/1994 | Rolando et al. | 525/54.1 |
| 5,367,003 | 11/1994 | Petcavich | 523/124 |
| 5,369,168 | 11/1994 | Famili et al. | 525/57 |
| 5,391,423 | 2/1995 | Wnuk et al. | 428/217 |
| 5,395,308 | 3/1995 | Fox et al. | 604/15 |
| 5,403,887 | 4/1995 | Kihira et al. | |
| 5,412,029 | 5/1995 | Elm et al. | 525/71 |
| 5,415,905 | 5/1995 | Middlesworth et al. | 528/35.7 |
| 5,417,679 | 5/1995 | Toms et al. | 604/370 |
| 5,429,874 | 7/1995 | VanPutte | 428/522 |
| 5,446,100 | 8/1995 | Durrance et al. | 525/221 |
| 5,466,749 | 11/1995 | Rolando | |
| 5,468,259 | 11/1995 | Sheth et al. | 8/497 |
| 5,489,470 | 2/1996 | Noda | 428/286 |
| 5,498,692 | 3/1996 | Noda | 528/361 |
| 5,498,785 | 3/1996 | Wang et al. | 525/371 |
| 5,509,913 | 4/1996 | Yeo | 604/364 |
| 5,532,066 | 7/1996 | Latiolais et al. | 428/483 |
| 5,540,663 | 7/1996 | Kroner et al. | 428/221 |
| 5,549,791 | 8/1996 | Herron et al. | 162/157.6 |
| 5,753,169 | 5/1998 | Kaito et al. | 264/211.19 |

FOREIGN PATENT DOCUMENTS

| | | |
|---|---|---|
| 52355/93 | 3/1994 | Australia . |
| 0 184 440 | 6/1986 | European Pat. Off. . |
| 0562582 | 9/1993 | European Pat. Off. . |
| 49-126742 | 12/1974 | Japan . |
| 61-272217 | 12/1986 | Japan . |
| 4-233 959 | 8/1992 | Japan . |
| 5-039 385 | 2/1993 | Japan . |
| 95 093 124 | 4/1993 | Japan . |
| 5-179 097 | 7/1993 | Japan . |
| 2 295 553 | 6/1996 | United Kingdom . |
| WO 94/00163 | 1/1994 | WIPO ............ A61L 15/24 |
| WO 94/00293 | 1/1994 | WIPO ............ B32B 27/08 |
| WO 95/11929 | 5/1995 | WIPO . |
| WO 95/20614 | 8/1995 | WIPO ............ C08G 63/08 |
| WO 95/20615 | 8/1995 | WIPO ............ C08G 63/08 |
| WO 95/20621 | 8/1995 | WIPO ............ C08J 5/18 |
| WO 95/23249 | 8/1995 | WIPO ............ D01D 5/098 |
| WO 95/23250 | 8/1995 | WIPO ............ D01D 5/40 |
| WO 96/21057 | 7/1996 | WIPO . |
| WO 96/21475 | 7/1996 | WIPO . |

OTHER PUBLICATIONS

Hu et al., CAPLUS AN 1995 : 604953 (1995).
Callais et al., CAPLUS AN 1992: 635081 (1992).
Bartczak, Z. and A. Galeski, "Changes in Interface Shape During Crystallization in Two–Component Polymer Systems," *Polymer,* 1986, vol. 27, Apr., pp. 544–548.
Mortensen, Kell, "Phase Behavior of Poly(propylene Oxide)– Poly(ethylene oxide)–Poly(propylene oxide) Triblock Copolymer Melt and Aqueous Solutions," *Macromolecules,* vol. 27, No. 20, 1994, pp. 5654–5666.
Song, Z. and W. E. Baker, "Melt Grafting of T–Butylaminoethyl Methacrylate Onto Polyethylene," *Polymer,* 1992, vol. 33, No. 15, pp. 3266–3273.
Tang, Tao and Baotong Huang, "Compatibilization of Polypropylene/Poly (Ethylene Oxide) Blends and Crystallization Behavior of the Blends," *Journal of Polymer Science: Part B: Polymer Physics,* vol. 32, (1994), pp. 1991–1998.

Primary Examiner—Jeffrey C. Mullis
Attorney, Agent, or Firm—Jones & Askew, LLP

[57] ABSTRACT

A process for making the grafted polyolefin includes the steps of adding a predetermined amount of polyolefin, a predetermined amount of 2-hydroxyethyl methacrylate and a free radical initiator to a reaction vessel. Preferably, the reaction vessel is an extruder. The constituents are then mixed under melt grafting conditions so that at least 5 weight percent of the 2-hydroxyethyl methacrylate is grafted onto the polyolefin to form a copolymer. The grafted polyolefin is then solidified.

21 Claims, No Drawings

METHOD OF MAKING GRAFTED POLYOLEFIN COMPOSITIONS

BACKGROUND OF THE INVENTION

The present invention relates to a process for making graft copolymers of polyolefins and alkyl acrylate. More particularly, the invention relates to melt grafting 2-hydroxyethyl methacrylate onto polyethylene and polypropylene resins.

Polyolefins such as polyethylene and polypropylene are non-polar polymers that, in general, are resistant to polar moieties. These polyolefins are customarily used commercially for barrier film applications. Such applications include product packaging to such commodities as disposable personal products like, sanitary napkins, diapers, adult incontinence products and the like.

Used polymers are typically disposed of by recycling, incineration or landfilling. Because of the increasing amount of material being sent to landfills it is becoming more important for the refuse to be biodegradable, compostable or both. In the area of disposable personal products, the outer polyethylene film layer has to be separated from the rest of the absorbent structure or the entire structure has to be comminuted.

Over the past decade or so interest has grown in modifying existing polymers to achieve commercially important copolymers having improved and, at times specific properties. This has been particularly evident in the drive to modify commodity polymers such as polyolefins with polar functional monomers such as acrylic acid and alkyl acrylates. For example, linear low-density polyethylene has been modified by melt grafting up to about 5 weight percent (wt. %) t-butylaminoethyl methacrylate (t-BAEMA) to produce a copolymer having improved properties for co-extrusion as tie layers. These tie layers are commercially important in the packaging and film industry to economically produce packages meeting specific requirements and sometimes governmental regulations.

Polyolefins have also been modified using acrylate esters such as methyl acrylate, 2-butyl acrylate, 2-ethylhexyl acrylate, decyl acrylate, octadecyl acrylate and corresponding esters of methacrylate.

Moreover, there is an increased emphasis on environmentally safe coatings for plastics. These coatings are reducing the use of solvent based coatings and relying, to an ever increasing degree, on polar coatings such as water based materials. The utility of the graft copolymer of the present invention includes, but would not be limited to, materials having a greater affinity for a polar coating. Other uses may include wire coatings, injected molded articles and barrier films having increased mechanical compatibility between the graft copolymer of the present invention and hydrophilic compositions.

The production of the compositions has generally been accomplished by blending all the constituents into a monomer-coated resin mixture. The heterogeneous mixture of resin coated with monomer is then extruded, in the presence of a reaction initiator, to form a graft copolymer. This method has been successful to produce graft copolymers having a comparatively low weigh percent of grafted monomer. Moreover, the efficiency of grafted monomer to the polyolefin resin low, with an efficiency of less than 50 percent. Due to the grafting limitations and process inefficiency, there is a need for an efficient process that is capable of producing graft copolymers having a greater amount of monomer grafted to the polyolefin.

SUMMARY OF THE INVENTION

Briefly, the present invention is a method of making a modified polyolefin copolymer having from 95 weight percent to about 70 weight percent of a polyolefin with the remaining portion of the composition an alkyl acrylate monomer grafted thereto, wherein the percent grafted monomer is based on the weight of the polyolefin and the weight of the grafted (meth)acrylate. More specifically, the composition of the present invention is an ethylene or propylene polymer composition having from 95 weight percent to about 70 weight percent of the polyolefin and from weight percent to about 30 weight percent of 2-hydroxyethyl methacrylate (HEMA) monomer grafted thereto. As used herein 2-hydroxyethyl methacrylate and HEMA are the same compound Surprisingly, it has now been found that graft copolymers of polyethylene or polypropylene can be obtained by melt grafting high levels, 5 weight percent to about 30 weight percent, of 2-hydroxyethyl methacrylate onto the polyolefin backbone. The polyolefin copolymer can be made by adding to a suitable reaction vessel and under melt grafting conditions, a predetermined amount of polyolefin polymer, adding a predetermined amount of 2-hydroxyethyl methacrylate monomer and a sufficient amount of reaction initiator to the melt to graft from 5 weight percent to about 30 weight percent of the 2-hydroxyethyl methacrylate onto the polyolefin. Desirably, the polyolefin copolymer is cooled sufficiently to solidify the melt.

It is a general object of the invention to provide method of making a composition having a higher weight percent of grafted monomer to a polyolefin than previously known. A more specific object of the invention is to provide a method of making a graft copolymer polyolefin having greater than 5 weight percent monomer grafted thereto.

Another object of the invention is to provide a method of making a composition having from 95 weight percent to about 70 weight percent of polyethylene and from 5 weight percent to about 30 weight percent 2-hydroxyethyl methacrylate grafted thereto.

It is another object of the invention to provide a method of grafting 2-hydroxyethyl methacrylate onto a polyolefin resin under melt conditions.

DETAILED DESCRIPTION OF THE INVENTION

The saturated ethylene polymers useful in the practice of this invention are homopolymers or copolymer of ethylene and polypropylene and are essentially linear in structure. As used herein, the term "saturated" refers to polymers which are fully saturated, but also includes polymers containing up to about 5% unsaturation. The homopolymers of ethylene include those prepared under either low pressure, i.e., linear low density or high density polyethylene, or high pressure, i.e., branched or low density polyethylene. The high density polyethylenes are generally characterized by a density that is about equal to or greater than C.94 grams per cubic centimeter (g/cc). Generally, the high density polyethylenes useful as the base resin in the present invention have a density ranging from about 0.94 g/cc to about 0.97 g/cc. The polyethylenes can have a melt index, as measured at 2.16 kg and 190° C., ranging from about 0.005 decigrams per minute (dg/min) to 100 dg/min. Desirably, the polyethylene has a melt index of 0.01 dg/min to about 50 dg/min and more desirably of 0.05 dg/min to about 25 dg/min. A ternatively, mixtures of polyethylene can be used as the base resin in producing the graft copolymer compositions, and such mixtures can have a melt index greater than 0.005 dg/min tD less than about 100 dg/min.

The low density polyethylene has a density of less than 0.94 g/cc and are usually in the range of 0.91 g/cc to about 0.93 g/cc. The low density polyethylene polymer has a melt index ranging from about 0.05 dg/min to about 100 dg/min and desirably from 0.05 dg/min to about 20 dg/min. Ultra low density polyethylene can be used in accordance with the present invention. Generally, ultra low density polyethylene has a density of less than 0.90 g/cc.

Generally, polypropylene has a semi-crystalline structure having a molecular weight of about 40,000 or more, a density of about 0.90 g/cc, a melting point of 168 to 171° C. for isotactic polypropylene and a tensile strength of 5000 psi. Polypropylene can also have other tacticities including syndiotactic and atactic.

Copolymers of ethylene which can be useful in the present invention may include copolymers of ethylene with one or more additional polymerizable, unsaturated monomers. Examples of such copolymers include, but are not limited to, copolymers of ethylene and alpha olefins (such as propylene, butene, hexene or octene) including linear low density polyethylene, copolymers of ethylene and vinyl esters of linear or branched carboxylic acids having 1–24 carbon atoms such as ethylene-vinyl acetate copolymers, and copolymers of ethylene and acrylic or methacrylic esters of linear, branched or cyclic alkanoes having 1–28 carbon atoms. Examples of these latter copolymers include ethylene-alkyl (meth)acrylate copolymers, such as ethylene-methyl acrylate copolymers.

The free radical initiators useful in the practice of this invention include acyl peroxides such as benzoyl peroxide; dialkyl; diaryl; or aralkyl peroxides such as di-t-butyl peroxide; dicumyl peroxide; cumyl butyl peroxide; 1,1-di-t-butyl peroxy-3,5,5-trimethytlcyclohexane; 2,5-dimethyl-2, 5-di(t-butylperoxy) hexane; 2,5-dimethyl-2,5-bis (t-butylperoxy) hexyne-3 and bis(a-t-butyl peroxyisopropylbenzene); peroxyesters such as t-butyl peroxypivalate; t-butyl peroctoate; t-butyl perbenzoate; 2,5-dimethylhexyl-2,5-di(perbenzoate); t-butyl di(perphthalate); dialkyl peroxymonocarbonates and peroxydicarbonates; hydroperoxidecs such as t-butyl hydroperoxide, p-methane hydroperoxide, pinane hydroperoxide and cumene hydroperoxide and ketone peroxides such as cyclohexanone peroxide and methyl ethyl ketone peroxide. Azo compounds such as azobisisobutyronitrile may also be used.

Other components well known in the art can be added to the graft copolymers to further enhance the properties of the resulting material. For example, polyethylene glycol can be added to improve the melt viscosity. Additives of other types normally used in polymer blends can also be incorporated to provide specific properties as needed. For example, antistatic agents, pigments colorants and the like. Additionally, processing characteristics can be improved by incorporating lubricants or slip agents into the blends. All of these additives are generally used in relatively small amounts, usually less than 3 weight percent.

Generally, at low levels of grafting the method is not especially critical, i.e., usually less than 3 weight percent of grafted monomer can be practiced by mixing the desired weight ratio of the polyolefin and 2-hydroxyethyl methacrylate in a blend vessei prior to melt milling or grafting. greater than about 3 weight percent grafting and in accordance with the invention the 2-hydroxyethyl methacrylate is mixed with the polyolefin polymer at a temperature above the softening point or above the temperature where they undergo deformation and are converted to a molten or fluid state.

The mixture of polyolefin and 2-hydroxyethyl methacrylate are subjected to mechanical deformation in a suitable mixing device, such as a Brabender Plasticorder, a roll mill, a single or multiple screw extruder or any other of the well known mechanical mixing equipment normally used in the mixing, compounding, processing or fabrication of polymers. A particularly desirable reaction vessel is an extruder having one or more ports.

The solid polyolefin, e.g., pellets or powder may be contemporaneously added with the 2-hydroxyethyl methacrylate monomer and the initiator to the mixing device. Optionally, if the mixing device has more than one port the 2-hydroxyethyl methacrylate and initiator constituents may be added to the molten polyolefin polymer.

The feed rates of the constituents to the melt mixing device are important. The 2-hydroxyethyl methacrylate and initiator can be metered continuously into the extruder or in several portions over a period of time to promote homogeneous grafting of the monomer throughout the mass of the polyolefin polymer. Although not wishing to be bound by any theory it is thought that the reaction is extremely fast and occurs to a major extent when the 2-hydroxyethyl methacrylate and initiator come in contact with the melt polyolefin polymer. However, the reaction may continue while the molten polymer is being conveyed away from the initial point of contact. The free radical initiator should be fed to the melt blend at a rate relative to the feed rate of the 2-hydroxyethyl methacrylate, that is, the ratio of initiator feed (weight basis) to monomer feed (weight basis) is greater than about 0.025, preferably, the free radical initiator relative feed rate is from about 0.025 to about 0.1, more preferably, from about 0.025 to about 0.075 and most preferably, from about 0.0375 to about 0.06.

Desirably, the 2-hydroxyethyl methacrylate monomer can be fed to the melt blend at a rate relative to the feed rate of the polyolefin, that is, the ratio of monomer (weight basis) to polyolefin (weight basis) is from 0.05 to about 0.3, preferably the monomer relative feed rate is from about 0.1 to about 0.25 and more preferably, the relative feed rate is from about 0.1 to about 0.2. Unexpectedly, it has been discovered that by adding the free radical initiator and 2-hydroxyethyl methacrylate at the rates described above the efficiency in grafting an amount of monomer to the polyolefin is greater than about 50 percent.

The extruder can have more than one port for the addition of the polyolefin polymer with one or more injection orifices at points where the polyolefin is molten for addition of 2-hydroxyethyl methacrylate and/or the initiator. The extruder may also have a section with a reduced pressure zone for venting off any unreacted 2-hydroxyethyl methacrylate and/or volatiles formed during the process.

The grafted 2-hydroxyethyl methacrylate content of the final modified polyolefin polymer can be from 5 weight percent to about 30 weight percent based on the total amount of monomer and polyolefin resin fed. Desirably, the polyolefin, i.e. polyethylene or polypropylene, has graft thereto from 10 weight percent to about 25 weight percent, and more preferably, from about 10 weight percent to about 20 weight percent.

Although specific values have been stated for the ranges above, one skilled in the art would understand that such ranges implicitly include all values within those ranges without specifically stating such values herein.

The present invention is illustrated in greater detail by the specific examples presented below, but it is to be understood that these are illustrative embodiments and this invention is not to be limited by any of the details of the description, but rather is to be construed broadly within its scope and spirit.

For Examples 1–13 a linear regression calibration curve was derived for each type of polyethylene following the methodology below.

Synthesis of Poly(2-hydroxyethyl Methacrylate) Homopolymer

Five hundred and twenty (520) grams of ethyl acetate and 130 grams of 2-hydroxyethyl methacrylate were added to a 1 liter, three-necked flask. The flask was heated to 60–65° C., while stirring. The system was closed and purged with nitrogen gas for one hour. The system was opened and 1.12 grams of benzoyl peroxide was added to the ethyl acetate/2-hydroxyethyl methacrylate solution. The system was closed, again, with nitrogen gas purge. After approximately four hours, a white precipitate had formed. The white precipitate was removed from the flask, suction filtered to remove excess solvent, and washed with 100–200 milliliters of ethyl acetate. The white precipitate was dried in a vacuum oven at 50° C. and 26 in Hg for ten hours to remove all solvent.

Calibration Curve for Determination of Percent Grafting Level by FT-IR Analysis

Samples of predetermined weight ratios of the polyethylene and synthesized poly(2-hydroxyethyl methacrylate) were blended in a melt mixer. Thin films of these known blend compositions were compression molded at a temperature of 374° F. and a pressure of 10,000–20,000 psi. Using FT-IR, the peak height ratio for the band at 1725 cm$^{-1}$ (due to the carbonyl group on 2-hydroxyethyl methacrylate) to the band at 720 cm$^{-1}$ (due to polyethylene) was determined for each of the polyethylene/poly(2-hydroxyethyl methacrylate) blends. Using this data, a graph of peak height ratio of 1725 cm$^{-1}$ to 720 cm$^{-1}$ versus percent poly(2-hydroxyethyl methacrylate) in the blends was made. Using linear regression, a best fit line was drawn through the data.

The best fit linear regression equation for low density polyethylene was:

% grafted HEMA=3.82+65.05 (Ratio of 1725 cm$^{-1}$ to 720 cm$^{-1}$).

The best fit linear regression equation for the linear low density polyethylene was:

% grafted HEMA=−0.38+38.63 (Ratio of 1725 cm$^{-1}$ to 720 cm$^{-1}$).

EXAMPLES 1–4

A low density polyethylene polymer having a melt index of 1.9 dg/min (available from Dow Chemical Company, Midland, Mich.) was grafted with 2-hydroxyethyl methacrylate by reactive extrusion. This was a single-step continuous process in which the grafting reaction was conducted in a 30 millimeter twin-screw extruder (Werner & Pfleiderer, ZSK-30) with vacuum devolatilization. The extruder had a total processing length of 880 millimeters, nine barrel sections and five heating zones. Barrel no. 1 was cooled by water. The heating elements for barrels 2 and 3 were coupled as Zone 1, barrels 4 and 5 were coupled as Zone 2, barrels 6 & 7 were coupled as Zone 3, barrel 9 was Zone 4 and the die was Zone 5. Vacuum devolatilization was located approximate 700 millimeters from the beginning of the screws. The polyethylene resin feed rate was 22 lb/hr, the 2-hydroxyethyl methacrylate monomer feed rate was 2.2 lb/hr and the respective feed rate of the free radical initiator is shown in Table 1 below. The constituent feed to the extruder comprised contemporaneously adding, at the extruder feed throat, the low deansity polyethylene resin, a solution of 2-hydroxyethyl methacrylate monomer (available from Aldrich Chemical Company, Milwaukee, Wis.) and initiator (2,5-dimethyl-2,5-di(t-butylperoxy) hexane, supplied by elf Atochem, 2000 Market St., Philadelphia, Pa. 19103-3222 under the tradename of Lupersol 101). The screw speed of the extruder was 300 rpm. The polymer melt was extruded into strands and cooled in a water bath and subsequently pelletized by a strand-cut type pelletizer. The collected pellets were dried under vacuum (29 inch Hg) for 18 hours to remove water.

Purifying the Modified Polyolefin for Determining Grafted HEMA Content

To remove unreacted 2-hydroxyethyl methacrylate and any homopolymer of 2-hydroxyethyl methacrylate the reaction products were purified. To purify the modified polyolefin, 5 grams of the modified polyolefin product obtained in the examples was added to a round-bottom flask containing 125 milliliters of xylenes. The flask was fitted with a condenser and stirred by a magnetic stirrer. The contents were heated to 140° C. to 150° C. in an oil bath and refluxed for 2 hours. After the modified polyolefin was completely dissolved in the solution, the hot xylenes solution was added, stirring continuously, to a beaker containing 800 milliliters of acetone at room temperature. The purified precipitate was collected by vacuum filtration and washed with 100 milliliters of acetone. The purified precipitate was dried in a vacuum oven at 50° C. and 25–30 inches of Hg until all solvent had been removed.

The purified products were pressed into a thin film at 374° F. and 10,000–20,000 psi and analyzed by Fourier-Transform Infrared Spectroscopy (FT-IR). The FT-IR spectra were collected using an Impact 400 model infrared spectrometer manufactured by Nicolet Instrument Corporation (5225 Verona Road, P. O. Box 44451, Madison, Wis. 53744-4451). In order to determine the degree of grafting of 2-hydroxyethyl methacrylate onto the particular polyethylene for a particular extrusion product, the peak height ratio for the band at 1725 cm$^{-1}$ (due to the carbonyl group on 2-hydroxyethyl methacrylate) to the band at 720 cm$^{-1}$ (due to polyethylene) was determined for each of the purified products. The calibration curve equation described above was used to convert this peak height ratio into the weight percent of grafted 2-hydroxyethyl methacrylate in each sample. The grafting level and grafting efficiency results appear in Table 1 below. The percentages are weight percent based on the weight of the polyethylene and grafted 2-hydroxyethyl methacrylate. A general discussion of using FT-IR for determining grafting efficiency is in "Melt grafting of t-butylaminoethyl methacrylate on polyethylene" by Song and Baker, POLYMER, Volume 33, Number 15 (1992), the disclosure of which is incorporated herein by reference.

TABLE 1

| Ex. No. | Zone Temps. °C. | Initiator rate lb/hr | FT-IR ratio | % Grafted | Graft Eff. % |
|---|---|---|---|---|---|
| 1 | 159, 175, 183, 173, 181 | 0.022 | 0.0188 | 5.0 | 50 |
| 2 | 160, 180, 187, 177, 181 | 0.044 | 0.0438 | 6.6 | 66 |
| 3 | 161, 180, 188, 178, 181 | 0.066 | 0.0770 | 8.7 | 87 |
| 4 | 166, 180, 189, 178, 181 | 0.088 | 0.0561 | 7.3 | 73 |

EXAMPLES 5–13

For examples 5–13, a linear low density polyethylene having a melt index of 2.3 dg/min and a density of 0.917 g/cc (supplied by Dow Chemical Company, Midland, Mich.) was fed to a Haake twin screw extruder (available from Haake, 53 West Century Road, Paramus, N.J., 07652). The extruder was 300 millimeters long having counter rotating twin conical screws. Each conical screw was 30 millimeters at the feed port and 20 millimeters at the die. The extruder had 4 temperature zones with the die being designated as Zone 4. The temperature of each zone is shown in Table 2. The constituent feed to the extruder comprised contemporaneously adding, at the extruder feed throat, the linear low density polyethylene resin at a rate of 5 lb/hr, the feed rates of the 2-hydroxyethyl methacrylate and the initiator (Lupersol 101) for each example are:

Example 5, the feed rate of the 2-hydroxyethyl methacrylate was 0.25 lb/hr, the feed rate of the initiator was 0.017 lb/hr and the screw speed was 150 rpm.

Example 6, the feed rate of the 2-hydroxyethyl methacrylate was 0.50 lb/hr, the feed rate of the initiator was 0.025 lb/hr and the screw speed was 150 rpm.

Example 7, the feed rate of the 2-hydroxyethyl methacrylate was 0.75 lb/hr, the feed rate of the initiator was 0.030 lb/hr and the screw speed was 150 rpm.

Example 8, the feed rate of the 2-hydroxyethyl methacrylate was 1.0 lb/hr, the feed rate of the initiator was 0.038 lb/hr and the screw speed was 150 rpm.

Example 9, the feed rate of the 2-hydroxyethyl methacrylate was 0.50 lb/hr, the feed rate of the initiator was 0.025 lb/hr and the screw speed was 50 rpm.

Example 10, the feed rate of the 2-hydroxyethyl methacrylate was 0.50 lb/hr, the feed rate of the initiator was 0.025 lb/hr and the screw speed was 100 rpm.

Example 11, the feed rate of the 2-hydroxyethyl methacrylate was 0.50 lb/hr, the feed rate of the initiator was 0.025 lb/hr and the screw speed was 200 rpm.

Example 12, the feed rate of the 2-hydroxyethyl methacrylate was 0.50 lb/hr, the feed rate of the initiator was 0.025 lb/hr and the screw speed was 150 rpm.

Example 13, the feed rate of the 2-hydroxyethyl methacrylate was 0.50 lb/hr, the feed rate of the initiator was 0.025 lb/hr and the screw speed was 150 rpm.

Following the procedures of Examples 1–4, each reactant product was purified, pressed into a film and tested using FT-IR analysis to determine the weight percent of 2-hydroxyethyl methacrylate grafted onto the LLDPE. Using the linear regression calibration curve for linear low density polyethylene, the amount of 2-hydroxyethyl methacrylate grafted to the of linear low density polyethylene was determined. The grafting level and grafting efficiency results appear in Table 2 below.

TABLE 2

| Ex. No. | Zone Temps. °C. | FT-IR ratio | Wt. % Grafted | Graft Eff. |
| --- | --- | --- | --- | --- |
| 5 | 180, 200, 200, 200 | 0.0723 | 2.4 | 49 |
| 6 | 180, 200, 200, 200 | 0.208 | 7.7 | 77 |
| 7 | 180, 200, 200, 200 | 0.387 | 14.6 | 97 |
| 8 | 180, 200, 200, 200 | 0.527 | 20 | 100 |
| 9 | 180, 200, 200, 200 | 0.0171 | 0.3 | 3 |
| 10 | 180, 200, 200, 200 | 0.151 | 5.5 | 55 |
| 11 | 180, 200, 200, 200 | 0.228 | 8.4 | 84 |
| 12 | 170, 180, 180, 180 | 0.273 | 10 | 100 |
| 13 | 180, 210, 210, 210 | 0.231 | 8.5 | 85 |

COMPARATIVE EXAMPLE A

Polypropylene polymer having a melt flow index of 35 dg/min (available from Montell, Three Little Falls Center, 2801 Centerville Rd., Wilmington, Dela.) was fed to the Haake twin screw extruder at a feed rate of 5.0 lb/hr. Using gel permeation chromatography analysis (GPC), the polypropylene was determined to have a number average molecular weight ($M_n$) of 60,100 g/mol, a weight average molecular weight ($M_w$) of 166,800 g/mol, and a polydispersity ($M_w/M_n$) of 2.78. The screw speed was set at 150 rpm and the four zone temperatures were set at 170, 180, 180, 180° C.

COMPARATIVE EXAMPLE B

Following the procedure of Comparative Example A the polypropylene was extruded at a peroxide initiator rate of 0.026 lb/hr. By GPC analysis, the $M_n$ was determined to be 40,900 g/mol, the $M_w$ was 90,700 g/mol and a polydispersity of 2.22. These values show that the addition of the free radical initiator produces severe degradation of the polypropylene.

EXAMPLES 14–20

The polypropylene of Comparative Example A was extrided using the Haake extruder (described in Examples 5–13). The screw speed was set at 150 rpm and the four zone temperatures were set at 170° C., 180° C., 180° C. and 180° C. The polypropylene resin, 2-hydroxyethyl methacrylate and initiator feed rates, in lb/hr., are in Table 3 below.

TABLE 3

| EXAMPLE | PP resin | HEMA | Initiator |
| --- | --- | --- | --- |
| 14 | 4.7 | 0.49 | 0.014 |
| 15 | 4.8 | 0.49 | 0.025 |
| 16 | 4.8 | 0.49 | 0.048 |
| 17 | 5.0 | 0.52 | 0.026 |
| 18 | 4.8 | 0.96 | 0.025 |
| 19 | 9.0 | 0.96 | 0.07 |
| 20 | 10.3 | 0.96 | 0.065 |

Following the procedures of Examples 1–4, each reactant product was purified and analyzed for elemental oxygen content by weight percent. The weight percent of oxygen in each sample was then divided by the weight fraction of oxygen in 2-hydroxyethyl methacrylate (0.369), to determine the weight percent of grafted 2-hydroxyethyl methacrylate in each sample. The grafting level and grafting efficiency results appear in Table 4 below. The elemental oxygen content of each sample was determined by Galbraith Laboratories, Inc. Knoxville, Tenn.

TABLE 4

| Ex. No. | Wt. % Grafted | Graft Efficiency |
| --- | --- | --- |
| 14 | 1.9 | 18 |
| 15 | 5.6 | 55 |
| 16 | 5.9 | 58 |
| *17 | 6.2 | 59 |
| 18 | 10.6 | 53 |
| 19 | 4.3 | 40 |
| 20 | 3.1 | 33 |

*This modified polypropylene was determined by GPC to have an $M_n$ of 55,300 g/mol, an $M_w$ of 146,900 g/mol and a polydispersity of 2.66. This indicates that the grafting of 2-hydroxyethyl methacrylate onto polypropylene using the process of the invention did not result in substantial degradation of the polypropylene.

EXAMPLE 21

The polypropylene of Comparative Example A was extruded using the 30 millimeter twin-screw extruder (Werner & Pfleiderer, ZSK-30) with vacuum devolatilization similar to that described above for Examples 1–4 with the following exception. The extruder had a total processing length of 1228 millimeters. Unreacted monomer was removed by vacuum devolatilization at the end of the extruder. The polypropylene resin feed rate was 25 lb/hr, the 2-hydroxyethyl methacrylate monomer feed rate was 2.25 lb/hr and the initiator feed rate was 0.125 lb/hr. The screw speed was 300 rpm and all the barrels temperatures were set at 190° C. The constituent feed to the extruder comprised injecting 2-hydroxyethyl methacrylate monomer into an injection port at a point where the polypropylene was melted. The initiator was injected into the melt blend at a subsequent injection port. The resulting polymer strands were cooled in a water bath, pelletized and dried under 29 inches of Hg vacuum for 18 hours to remove the water. The weight percent of grafted 2-hydroxyethyl methacrylate, determined by elemental oxygen content, was 2.57.

While the invention has been described with reference to a preferred embodiment, those skilled in the art will appreciate that various substitutions, emissions, changes and modifications may be made without departing from the spirit hereof. Accordingly, it is intended that the foregoing examples be deemed merely exemplary of the present invention and not be deemed a limitation thereof.

What is claimed is:

1. A method for grafting 2-hydroxyethyl methacrylate onto a polyolefin comprising the steps of:
    a) contemporaneously adding a predetermined amount of the polyolefin, a predetermined amount of 2-hydroxyethyl methacrylate and a predetermined amount of a free radical initiator to a reaction vessel, wherein the polyolefin has a number average molecular weight of greater than about 40,000 g/mol;
    b) mixing the constituents of (a) under appropriate conditions to melt graft greater than 11 weight percent of 2-hydroxyethyl methacrylate onto the polyolefin at a grafting efficiency greater than 50%; and
    c) solidifying the melt grafted polyolefin; wherein the melt grafted polyolefin is substantially soluble in xylenes.

2. The method of claim 1 wherein said polyolefin is selected from the group consisting of ultra high molecular weight polyethylene, high density polyethylene, ultra low density polyethylene, low density polyethylene, linear low density polyethylene and polypropylene.

3. The method of claim 1 wherein said polyolefin has a melt index greater than about 0.01 decigrams/min to about 100 dg/min at 2.16 kg and 190° C.

4. The method of claim 1 wherein said polyolefin has a melt index of about 0.05 dg/min to about 25 dg/min.

5. The method of claim 1 wherein said reaction vessel is an extruder.

6. The method of claim 1 wherein the free radical initiator is selected from the group consisting of acyl peroxides, dialkyl peroxides, diaryl peroxides, aralkyl peroxides, peroxyesters dialkyl peroxymonocarbonates, peroxydicarbonates, hydroperoxides and ketone peroxides.

7. The method of claim 6 wherein said free radical initiator is selected from the group consisting of benzoyl peroxide; di-t-butyl peroxide; dicumyl peroxide; cumyl butyl peroxide; 1,1-di-t-butyl peroxy-3,5,5-trimethylcyclohexane; 2,5-dimethyl-2,5-di(t-butylperoxy) hexane; 2,5-dimethyl-2,5-bis (t-butylperoxy) hexyne-3; bis (a-t-butyl peroxyisopropylbenzene); t-butyl peroxypivalate; t-butyl peroctoate; t-butyl perbenzoate; 2,5-dimethylhexyl-2,5-di(perbenzoate); t-butyl di(perphthalate); t-butyl hydroperoxide; p-methane hydroperoxide; pinane hydroperoxide; cumene hydroperoxide; cyclohexanone peroxide and methyl ethyl ketone peroxide.

8. The method of claim 7 wherein said free radical initiator is 2,5-dimethyl-2,5-di(t-butylperoxy) hexane.

9. The method of claim 1 wherein the amount of the free radical initiator relative to the amount of 2-hydroxyethyl methacrylate added to the reaction vessel is a ratio greater than 0.025, wherein said amounts are based on weight.

10. The method of claim 5 wherein the amount of he free radical initiator relative to the amount of 2-hydroxyethyl methacrylate added to the extruder is a ratio from about 0.025 to about 0.1, wherein said amounts are based on weight.

11. The method of claim 5 wherein the amount of the free radical initiator relative to the amount of 2-hydroxyethyl methacrylate added to the extruder is a ratio from about 0.025 to about 0.075, wherein said amounts are based on weight.

12. The method of claim 5 wherein the amount of the free radical initiator relative to the amount of 2-hydroxyethyl methacrylate added to the extruder is a ratio from about 0.0375 to about 0.06, wherein said amounts are baised on weight.

13. The method of any one of claims 1, 9, 10, 11 or 12 wherein the amount of 2-hydroxyethyl methacrylate relative to the amount of polyolefin added to the reaction vessel is a ratio of 0.05 to about 0.3, wherein said amounts are based on weight.

14. The method of claim 13 where in the amount of 2-hydroxyethyl methacrylate relative to the amount of polyolefin added to the reaction vessel is a ratio of 0.1 to about 0.25, wherein said amounts are based on weight.

15. The method of claim 5 wherein the amount of 2-hydroxyethyl methacrylate relative to the amount of polyolefin added to the extruder is a ratio of 0.1 to about 0.2, wherein said amounts are based on weight.

16. A method for grafting 2-hydroxyethyl methacrylate onto a polyolefin comprising the steps of:
    a) contemporaneously adding a predetermined amount of the polyolefin, a predetermined amount of 2-hydroxyethyl methacrylate and a predetermined amount of a free radical initiator to a reaction vessel, wherein the amount of the free radical initiator relative to the amount of 2-hydroxyethyl methacrylate is a ratio from about 0.025 to about 0.1, wherein said amounts are based on weight, further wherein the polyolefin ha s a number average molecular weight of creater than about 40,000 g/mol;
    b) mixing the constituents of (a) under appropriate conditions to melt graft greater than 10 weight percent of 2-hydroxyethyl methacrylate onto the polyolefin; and
    c) solidifying the melt grafted polyolefin; wherein the melt grafted polyolefin is substantially soluble, in xylenes.

17. The method of claim 16 wherein said reaction vessel is an extruder.

18. A method for grafting 2-hydroxyethyl methacrylate onto a polyolefin comprising the steps of:
    a) contemporaneously adding a predetermined amount of the polyolefin, a predetermined amount of 2-hydroxyethyl methacrylate and a predetermined amount of a free radical initiator to an extruder, wherein the amount of 2-hydroxyethyl methacrylate relative to the amount of polyolefin is a ratio from about 0.05 to about 0.3 and wherein the amount of the free radical initiator relative to the amount of 2-hydroxyethyl methacrylate is a ratio from about 0.025 to about 0.1, wherein said amounts are based on weight, further wherein the polyolefin has a number average molecular weight of greater than about 40,000 g/mol;

b) mixing the constituents of (a) under appropriate conditions to melt graft greater than 10 weight percent of 2-hydroxyethyl methacrylate onto the polyolefin; and c) solidifying the melt grafted polyolefin; wherein the melt grafted polyolefin is substantially soluble in xylenes.

19. The method of claim 18 wherein said polyolefin is selected from the group consisting of ultra high molecular weight polyethylene, high density polyethylene, ultra low density polyethylene, low density polyethylene, linear low density polyethylene and polypropylene.

20. The method of claim 16, wherein the 2-hydroxyethyl methacrylate is grafted onto the polyolefin at a grafting efficiency greater than 50%.

21. The method of claim 18, wherein the 2-hydroxyethyl methacrylate is grafted onto the polyolefin at a grafting efficiency greater than 50%.

* * * * *